United States Patent [19]

Humblot

[11] Patent Number: 4,737,611

[45] Date of Patent: Apr. 12, 1988

[54] APPARATUS FOR RECEIVING AND HOLDING TOOLS

[75] Inventor: Bernard Humblot, Bazemont, France

[73] Assignee: Steelweld-France, Le Vesinet, France

[21] Appl. No.: 909,206

[22] Filed: Sep. 19, 1986

[51] Int. Cl.$^4$ .............................................. B23K 11/00
[52] U.S. Cl. ................................. 219/86.25; 219/119;
901/30; 901/41; 901/42
[58] Field of Search .................. 219/119, 86.25, 125.1,
219/136; 901/30, 41, 42

[56] References Cited

U.S. PATENT DOCUMENTS

| 4,046,263 | 9/1977 | Cwycyshyn et al. | 901/42 |
| 4,309,809 | 1/1982 | Yokoe et al. | 901/30 |
| 4,480,171 | 10/1984 | Christiansen et al. | 219/136 |
| 4,551,903 | 11/1985 | Bisiach | 219/125.1 |

FOREIGN PATENT DOCUMENTS 0043153  1/1982  European Pat. Off. .

OTHER PUBLICATIONS

Japanese Patent Abstracts, vol. 7, No. 50 (M-197) [1195], Feb. 26, 1983, and Japanese Patent No. 57-199,576, Nippon Kokan K.K.

Primary Examiner—Clifford C. Shaw
Attorney, Agent, or Firm—Sandler & Greenblum

[57] ABSTRACT

An apparatus for receiving and holding tools, specifically resistance welding units, carried by a robot programmed to execute certain movements including the placing of these tools at a specific location, including a base, for a vertical frame having a series of radial supports which can be rotated about a vertical axis and immobilized in positions in which the radial supports are disposed opposite various work stations, and respective mechanisms for decoupling a tool from the robot and for coupling a tool to the robot, so that at any one time the robot only carries one tool while other tools which may be used by the robot are freely available for repair and maintenance without interrupting the operation of the robot.

18 Claims, 9 Drawing Sheets

APPARATUS FOR RECEIVING AND HOLDING TOOLS

BACKGROUND OF THE INVENTION

1. Field of the Invention

The present invention is directed to apparatus for receiving tools. More particularly, the present invention is directed to apparatus for receiving and holding tools, such as welding units associated with welding installations. Specifically, the present invention is directed to apparatus for receiving and holding resistance welding tools mounted in welding installations which are used in automated assembly lines which include one or more robots for carrying out a series of operations, such as spot welding.

2. Description of Background Information

In conventional welding installations, each welding unit is mounted or otherwise carried by a robot which applies a series of movements to the welding unit that it carries which correspond to the various spot welds to be executed. The installation includes a station where the robot deposits the welding unit at a specific location, disconnects the unit and couples itself to another welding unit or device, for example when different tasks are executed on the line.

The locations along the welding installation provided for receiving and taking up tools are disposed in areas situated outside the working area of the robot but in a restricted area to which access by personnel is barred for reasons of safety. Should the need arise for a person to enter the restricted areas, all the robots must be shut down completely. Consequently, the installations include various safety systems for barring access to restricted areas while the robots are operating. An installation of this kind, however, has a number of disadvantages, as discussed further herein below.

A robot is characterized by the maximum load that it can move. Although an integrated coupling and decoupling system significantly increases the mass which can be moved by the robot, such integrated systems often lead to premature wear of the robot. Should a robot break down, it is extremely difficult, if not impossible, to disconnect its tools because the coupling and decoupling mechanism is usually operated by a pressurized fluid, such as hydraulic fluid, and when pressure is lost, because of break down or shut down, it is difficult and often impossible to activate the fittings required to release the tools.

In any event, while the robot is in operation, it is impossible to manually operate, work on or repair the tools even on a tool that is not in use, because the tools are in a restricted area. Consequently, it is not possible to service or replace a tool that is not being used while the assembly lines including the robots are in operation. Nevertheless, service, maintenance, repair, such as electrode changing, and other operations are routinely required, and it is necessary to shut down the robots in order to perform these functions. Such down-time naturally reduces productivity of the line.

Although consideration has been given to providing means for decoupling the tools from the robot and means for coupling the tools to the robot in the restricted areas or locations intended to receive the tools so as to avoid any unnecessary increase in the weight of the robot, this kind of arrangement still has some of the previously discussed disadvantages.

The present invention provides a device which alleviates the various disadvantages described above.

SUMMARY OF THE INVENTION

The present invention relates to a device for receiving and holding tools, especially resistance welding units, carried by a robot programmed to execute certain movements, including the placing of tools at a specific location.

An object of the present invention is the provision of an apparatus for receiving and storing tools which includes a base adapted to be fastened to a floor; a vertical frame supported by the base; a plurality of radial supports extending from the vertical frame; and means for rotating the vertical frame about a vertical axis to position the radial supports at predetermined locations adjacent work stations operable associated with the frame, preferably wherein the base is provided with vertical columns and a horizontal beam supported by the vertical columns on which are mounted means for receiving and holding a tool.

Another object of the present invention is an apparatus for receiving and storing tools, as described above, which includes means for manipulating a tool, which is preferably a robot, adapted to contact the means for receiving the tool, which preferably also includes means for detaching the tool from the means for manipulating a tool adapted to present the tool to the means for receiving the tool, means for coupling the tool to the means for manipulating a tool adapted to convey the tool from the means for receiving and holding the tool.

Another further object of the present invention is the provision of an apparatus for receiving and storing tools, as described above, which includes another vertical frame including a horizontal member located in the vicinity of the vertical support to which the means for detaching and the means for coupling are attached so as to be adjacent the tool.

Another still further object of the present invention is the provision of an apparatus for receiving and storing tools, as described above, wherein the tools are resistance welding units having electrodes and one of the work stations is for grinding the electrodes, preferably wherein the work station for grinding the electrodes includes a piston-and-cylinder actuator equipped with a head adapted to cooperate with an end of a tool; two grinding wheels adapted to be inserted between the electrodes operably associated with the actuators; a motor for driving the grinding wheel; and means for moving the electrodes towards each other, which preferably also includes a support for the motor and means coupled to the support for adjusting the angular position of the motor.

Another yet still further object of the present invention is the provision of an apparatus for receiving and storing tools, as described above, wherein the means for manipulating a tool includes a head which is made up of means for connection to an end of a tool; moveable latches adapted to cooperate with corresponding lugs at that end of the tool; and a sliding key adapted to be housed in a passage in the head and adapted to operate the latches; preferably wherein the means for coupling a tool includes a first piston-and-cylinder actuator carried on the horizontal member having a piston rod equipped with a plunger adapted to engage in the passage in the head so as to push the key in a corresponding first direction, and the means for detaching a tool includes a second piston-and-cylinder actuator equipped with a plunger adapted to engage in the passage in the head so as to push the key in a corresponding second direction opposite to the first direction, and wherein the head also includes two carriages disposed one on each side of the key adapted to cooperate with a respective latch pivotally connected to the head; a respective recess in each carriage on the side facing toward the key; a respective roller adapted to engage in each recess; and a respective ramp surface on the key adapted to cooperate with each roller so that movement of the key in one direction moves the carriages further apart, and movement of the key in the opposite direction moves the carriages closer together, to provide an apparatus for receiving and holding which preferably also includes units moveable on the horizontal member for carrying the first and second piston-and-cylinder actuators.

It is also an object of the present invention to provide a method for automatically replacing tools manipulated by a robot which involves providing a frame elongated along a vertical axis having at least one radially extending support equipped with means for holding a tool operably connected to means for rotating a radially extending support about the vertical axis to position the radially extending support at predetermined locations adjacent work stations; locating a support frame including a generally elongate horizontal member equipped with means for receiving a tool in the vicinity of the vertical frame adapted to communicate with the means for holding a tool; positioning a robot having means for manipulating a tool adjacent the support frame so that it can be contacted by the means for receiving a tool; activating the means for receiving a tool thereby causing it to contact the means for manipulating a tool, to detach the tool from the means for manipulating a tool and to present the tool to the means for holding a tool.

It is another object of the present invention to provide a method for automatically replacing tools, as described above, which also involves rotating the radially extending support about the vertical axis of the frame so as to remove the tool held by the means for holding a tool away from the means for receiving a tool to a work station.

It is yet another object of the present invention to provide a method for automatically replacing tools, as discussed above, which also involves supplying a tool to the means for holding a tool on the radially extending support; rotating the radially extending support around the vertical axis of the frame to convey the tool to the means for receiving a tool; and activating the means for receiving a tool to disconnect the tool from the means for receiving a tool and to transfer the tool to the means for manipulating a tool.

It is another further object of the present invention to provide a method for automatically replacing tools, as discussed above, wherein the tool is a welding unit having electrodes and the work station includes a grinder having abrasive elements for cleaning the electrodes of the welding unit which involves moving the welding unit relative to the grinder so as to contact the electrodes against the abrasive elements.

DETAILED DESCRIPTION AND DESCRIPTION OF THE PREFERRED EMBODIMENT

In one embodiment of the present invention a device is provided which is composed of a base adapted to be fastened to a floor adjacent to a robot; a vertical frame supported by the base; a series of radial supports on the vertical frame; means for rotating the vertical frame about a vertical axis, means for immobilizing the vertical frame in positions in which the radial supports are disposed opposite various work stations; and means for disconnecting or decoupling a tool from the robot and means for coupling a tool to the robot.

This arrangement is advantageous in that the weight carried by the robot is reduced because the coupling and decoupling members are provided on the device so that the supports can remove the tools disconnected from the robot from the restricted area so that all necessary servicing, repair and similar operations can be performed without shutting down any of the robots, the production line or the manufacturing operation.

In another embodiment of the invention the base includes vertical columns and a horizontal beam supported by the vertical columns on which the means for decoupling a tool from the robot and the means for coupling a tool to the robot are mounted.

In another embodiment where the tools are resistance welding units incorporating electrodes, one of the work stations on the assembly line is a work station for grinding the electrodes. To this end, the work station for grinding the electrodes may be equipped with a piston-and-cylinder actuator provided with a head adapted to cooperate with an end of a tool and including a motor; two grinding wheels driven by the motor adapted to be inserted between the electrodes; and means for moving the electrodes towards each other. In addition, the motor driving the grinding wheels for grinding the electrodes may be carried by a support coupled to means for adjusting its angular position so that the electrodes on different types of welding unit can be ground.

In another embodiment, for use when the robot has a head, the device of the present invention includes means on the head adapted to be connected to a corresponding end of a tool; movable latches adapted to cooperate with corresponding lugs at an end of a tool; and a sliding key adapted to be housed in a passage in the head of the robot and adapted to operate the latches. In such a device the means for coupling a tool to the robot includes a first piston-and-cylinder actuator carried on the horizontal beam and having a piston rod equipped with a plunger adapted to engage in the passage in the head so as to push the key in a corresponding first direction. The means for coupling a tool from the robot includes a second piston-and-cylinder actuator equipped with a plunger adapted to engage in the passage in the head so as to push the key in a corresponding second direction opposite to the first direction.

In accordance with another embodiment of the invention, the device is provided on the head of the robot with two carriages disposed one on each side of the key which are adapted to cooperate with a respective latch, which is pivotally connected to the head, a respective recess on each carriage, a respective roller on the side facing towards the key adapted to engage in each recess, and a respective ramp surface on the key adapted to cooperate with each roller so that movement of the key in one direction moves the carriage further apart and movement of the key in the opposite direction moves the carriages closer together. Preferably the piston-and-cylinder actuators forming the means for coupling the tool to and decoupling the tool from the head of the robot are carried by members movable on the beam so that the means for coupling and the means for decoupling may be accurately positioned.

The invention will now be described in more detail with reference to specific embodiments given by way of example only and shown in the appended drawings.

Figure 1:
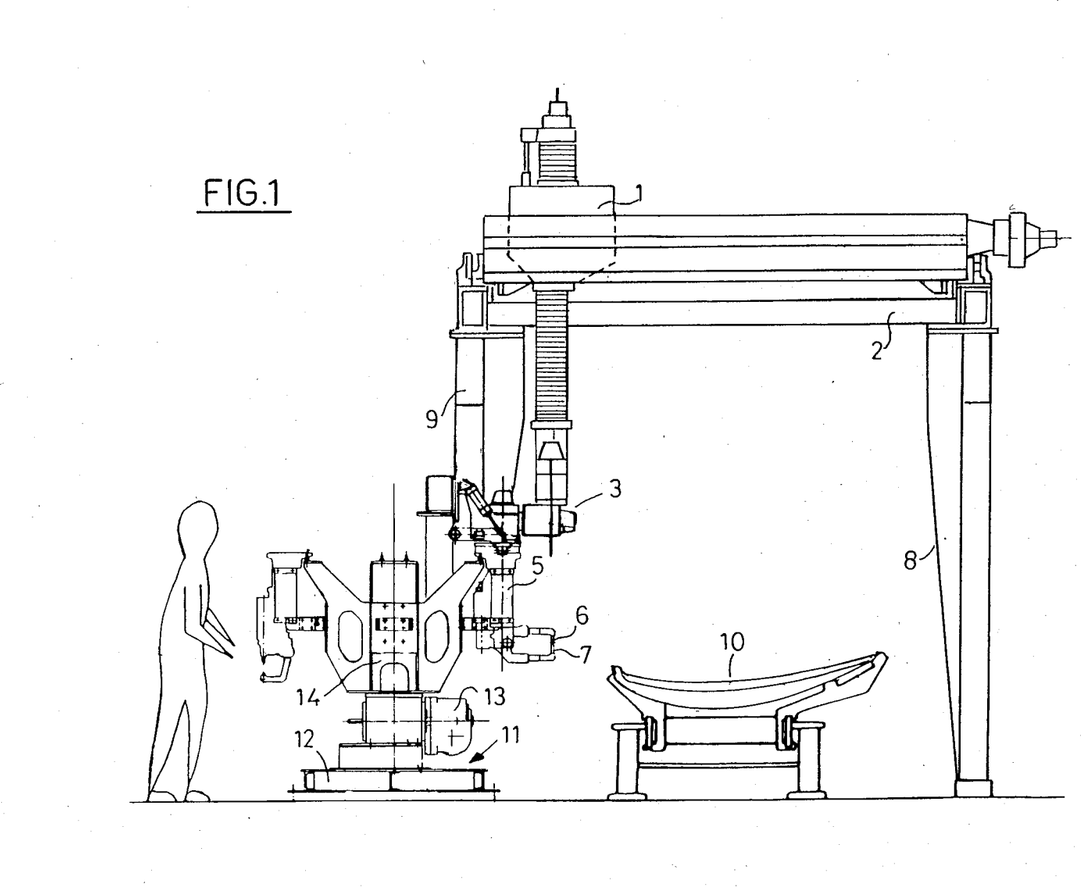
FIG. 1 is a view in elevation of a device in accordance with the invention.

FIG. 1 shows a robot 1 which is movable mounted to slide on a gantry 2. The head 3 of the robot supports a resistance welding unit 5 which includes two welding electrodes 6 and 7. The resistance welding unit 5 is designed to apply a series of spot welds on a work piece 10. To this end, robot 1 is programmed to move the welding unit 5 into various positions for executing these welds. The gantry 2 is supported on columns 8 and 9 and entry to the space delineated by these columns is barred to access to avoid the risk of accidents.

The apparatus, generally shown as element 11, in accordance with the present invention is disposed in the vicinity of columns 8 and 9 and at a location corresponding to the maximum displacement of the robot 1. The device 11 includes a base 12 positioned on and preferably fastened to the floor. The base 12 supports a motor 13 which rotates a vertical frame 14 provided with a plurality of supports in rotational increments of predetermined degrees. The motor preferably includes a gear mechanism (not shown) for reducing the speed of rotation relative to the r.p.m.'s of the motor. The supports extend radially from vertical frame 14 and are spaced apart from each other at predetermined intervals. The motor, therefore, is programmed to rotate in increments which correspond in degrees to the angles between adjacent supports. In a preferred embodiment, shown in FIG. 2, four supports 15, 16, 17 and 18 are offset angularly at 90°.

Figure 2:
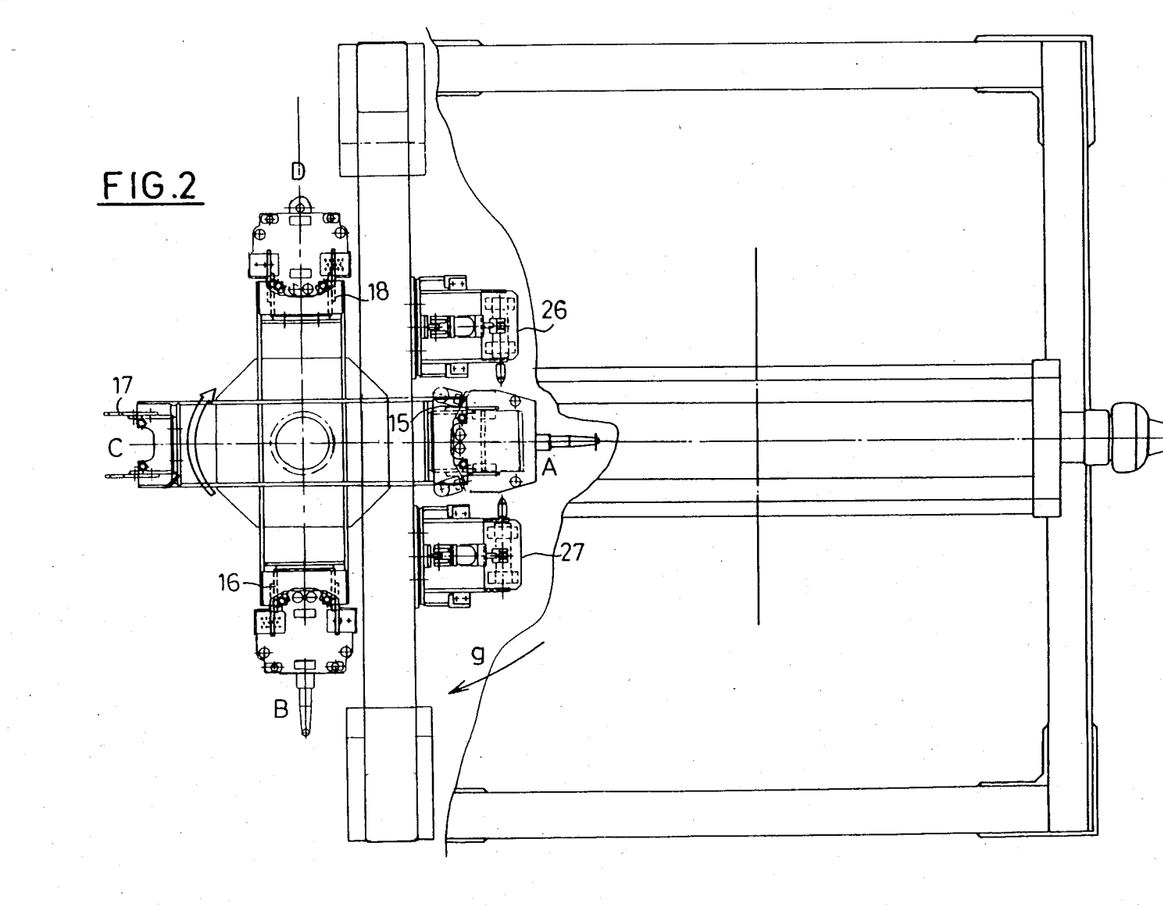
FIG. 2 is a plan view of the device shown in FIG. 1.

Referring now to FIG. 2, each support 15, 16, 17 and 18 includes two arms 20 having notches 21 adapted to receive fingers 22 provided on the resistance welding unit 5. Studs 23, adapted to enter corresponding holes in the resistance welding unit 5, are attached to the upper part of each support. Thus, when a resistance welding unit 5 is placed on a support 15, 16, 17 or through 18 it is locked and held in a specific position.

The base 12 also supports pairs of columns 24 which support a beam 25 on which are mounted two units 26 and 27, one of which controls decoupling of the welding unit 5 from the robot and the other of which controls coupling of the welding unit 5 to the robot 1.

Figure 9:
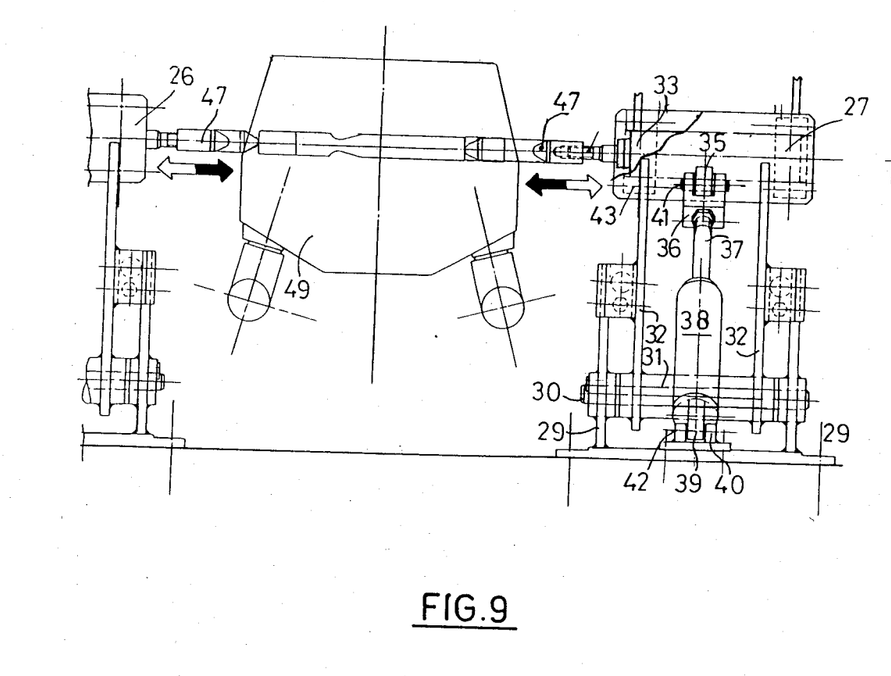
FIGS. 9 and 10 show in elevation, from the front and from the side, the means for controlling coupling of the welding unit to and decoupling it from the robot.
Figure 10:
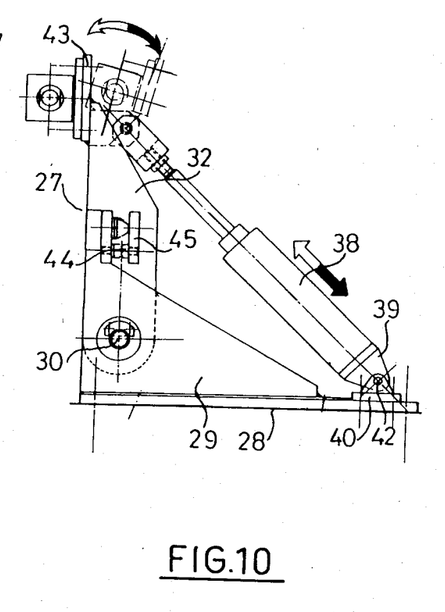

As shown more clearly in FIGS. 9 and 10, the unit 26 includes a place 28 fixed to the side of the beam 25 facing the robot 1. The plate 28 is provided with two cheeks 29 supporting a shaft 30 on which is mounted a sleeve 31 to which are fastened two bars 32. The free ends of bars 32 are attached to a plate 43 which supports the body 33 of a pneumatic piston-and-cylinder actuator. Fixed to the plate 43 is a lug 35 through which passes a shaft 41 that also passes through the branches of a yoke 36 fixed to the free end of a piston rod 37 of a piston-and-cylinder actuator 38. The cheeks 29 include abutments 44 which are adapted to bear against corresponding abutments 45 provided on the bars 32. The unit 27 is identical to the unit 26 and the corresponding reference numbers are used to designate identical components. The piston-and-cylinder actuators 33 are double-acting actuators and the piston rod 46 thereof is provided at its free end with a plunger 47.

The robot 1 has a head 49 including connections for the various lines supplying the welding unit 5 in addition to means for coupling the head to and decoupling it from the welding unit.

Figure 8:
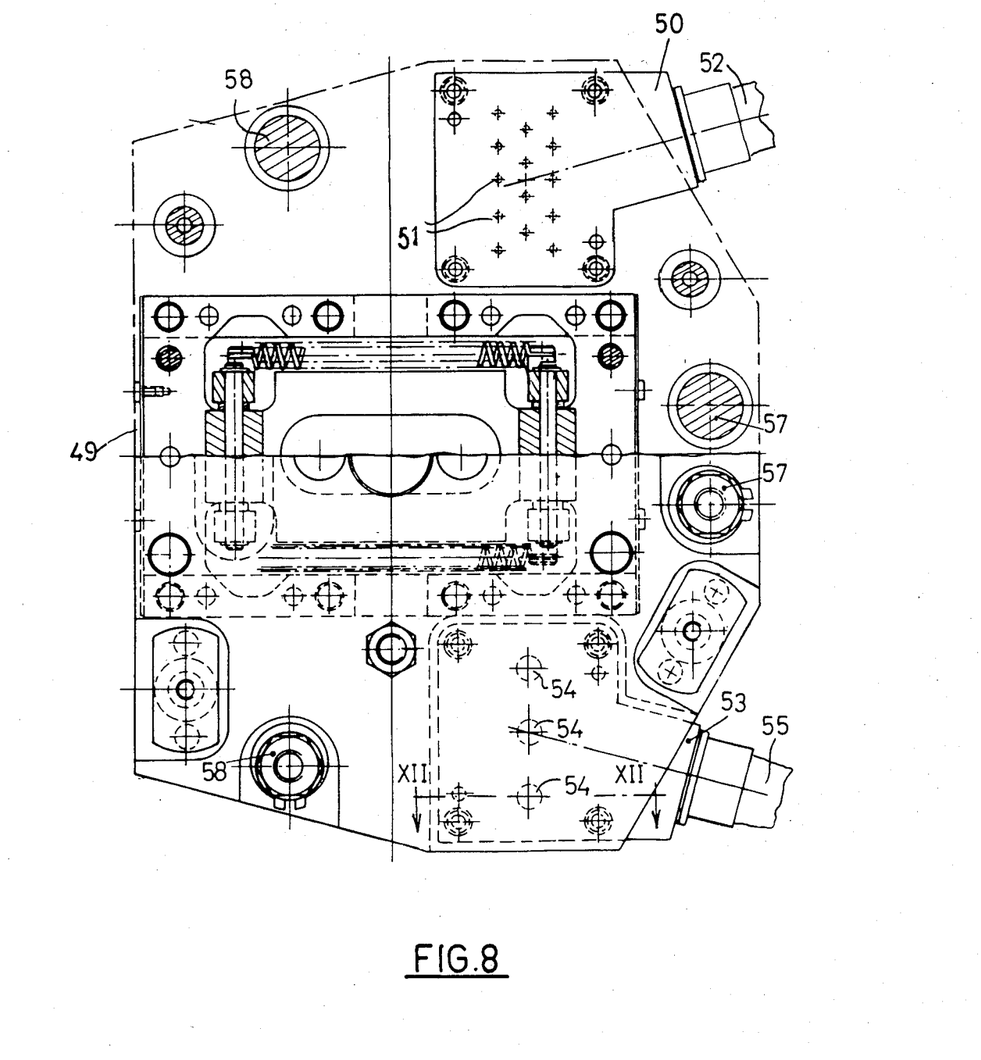
FIG. 8 shows part of the robot in plan view.
Figure 12:
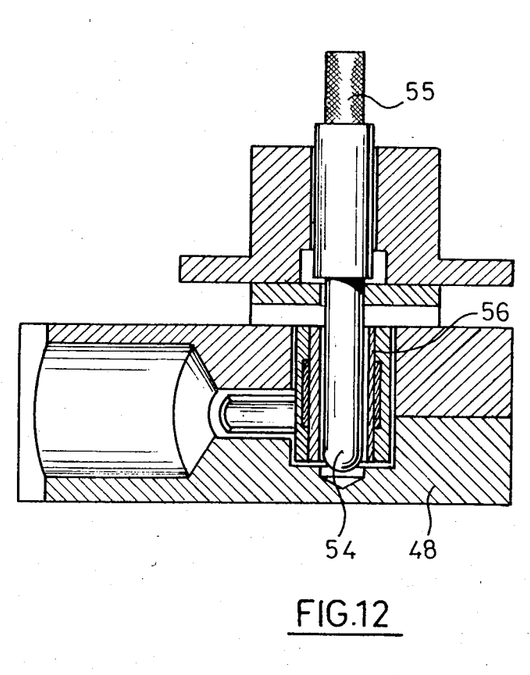
FIG. 12 is a view of an electrical coupling in cross-section on the line 12—12 in FIG. 8.

Referring to FIG. 8, the head 49 is provided with a connector 50 having a series of male plugs 51 connected by a cable 52 to an electrical power supply (not shown) on the side of head 49 adapted to face towards the top 48 of the welding unit 5. The male plugs 51 mate with corresponding female members on the top 48 of the welding unit 5 which are connected to various control and monitor circuits. There is a second electrical connector 53 provided with male plugs 54 electrically connected to a supply cable 55. The male plugs 54 are adapted to cooperate with female members 56 provided on the top 48 of the welding unit 5 and the female members are electrically connected to the primary of the transformer of said unit 5 (see FIG. 12).

Figure 11:
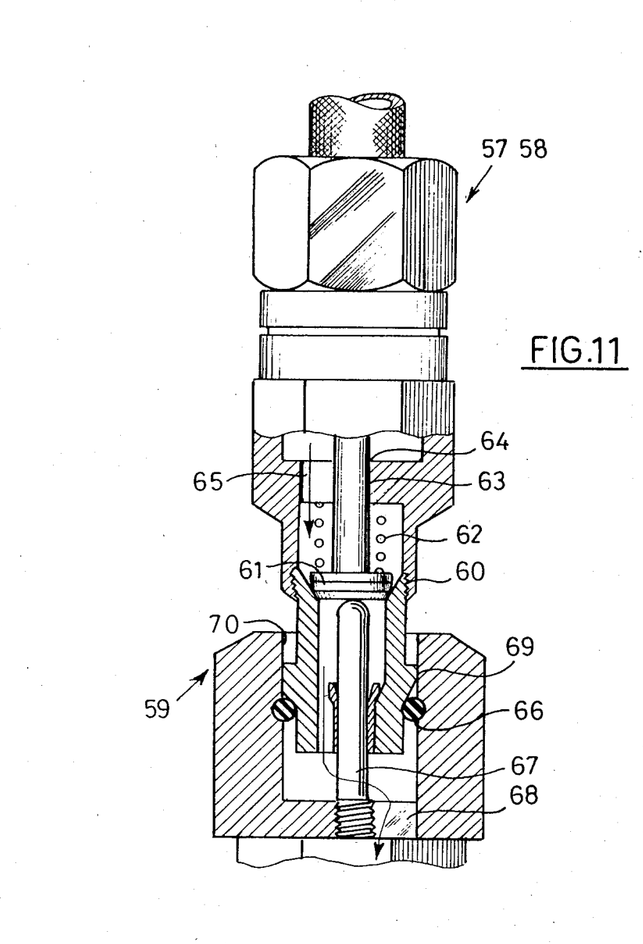
FIG. 11 is a view in cross-section of a connector.

The welding units must be connected to a cooling water circuit and also to a compressed air circuit for operation of a pneumatic piston-and-cylinder acutator which moves the electrodes closer together or further apart. To this end, the head 49 includes fittings 57 which are connected to a pressurized water circuit and fittings 58 which are adapted to be connected to a compressed air circuit. As shown in more detail in FIG. 11, these fittings are of a male type adapted to cooperate with female fittings 59, provided on the top 48 of welding unit 5 and arranged so that when they are coupled together they permit the passage of fluid and when they are separated the male part is shut off. Each male part 57 or 58 includes an integral seat 60 for a valve 61 which is urged towards its closed position by a spring 62. The stem 63 of valve 61 is guided in a hole 64 in a radial bar 65 fastened to the inside of the male part. The female part 59 features an internal bore adapted to receive the corresponding end of the male part. The female part 59 is also provided with an elastic ring 66 adapted to cooperate with a shoulder 69 to retain the male part when the male and female parts are inserted together. A finger 67 is located inside the female part 59. As shown, finger 67 is carried by bars 68 which are fastened into the bore 70 and adapted to bear against the free end of the stem 63 so as to push back the valve 61 to permit the fluid to flow when the male and female parts are coupled together. It will be understood that as soon as the male and female parts are separated the valve will close.

Figure 4:
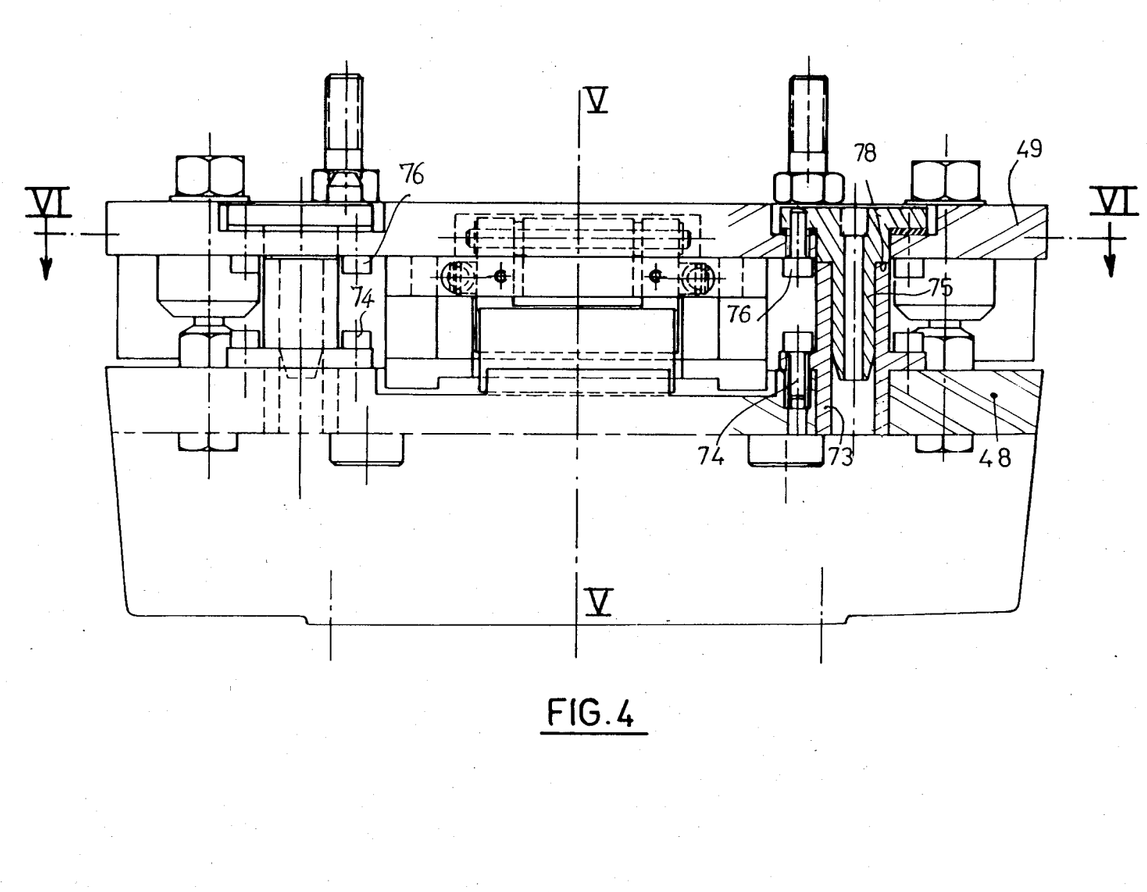
FIG. 4 shows to a larger scale and partly in cross-section the coupling between the robot and the welding unit.

Referring now more particularly to FIG. 4, the top 48 includes sleeves 73. The sleeves 73 are attached to the top by screws 74 into which may be inserted fingers 75 which are fastened by screws 76 to the bottom surface of the head 49. The fingers 75 have shoulders 78 which limit their insertion into the sleeves 73. This arrangement of members forms a guide assembly so that the coupling between the head 49 of the robot and the top 48 takes place in a strictly defined position so that the electrical, pneumatic and hydraulic connections are made precisely and without any risk of a bad connection or damage.

Figure 6:
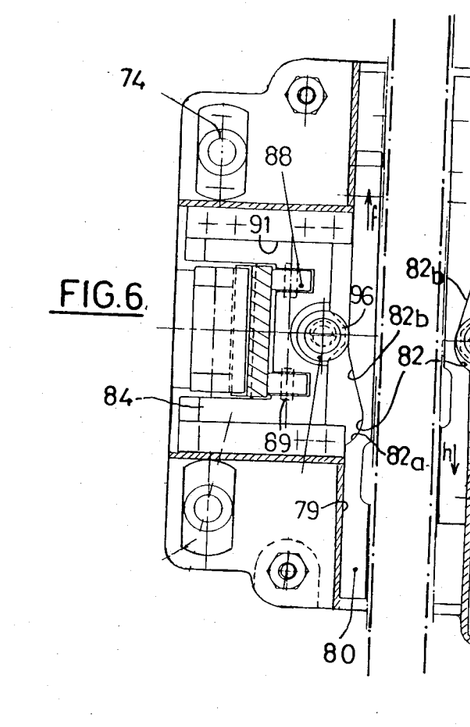
FIG. 6 is a view in cross-section on the line 6—6 in FIG. 4.
Figure 6A:
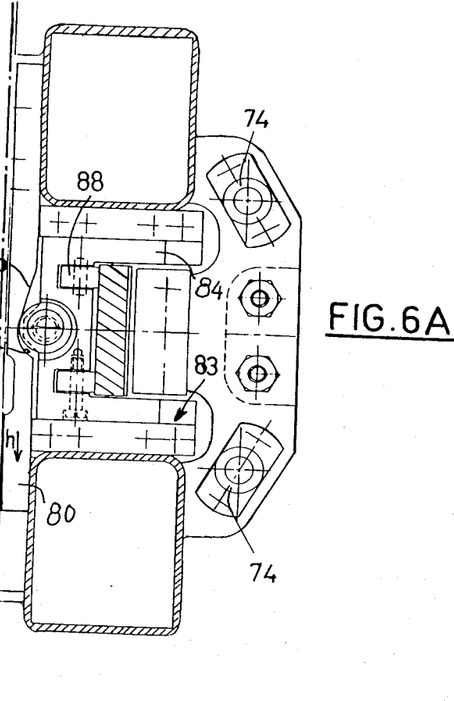
FIG. 6a is a view analogous to FIG. 6 but for an unlatched position.

Turning to FIG. 6, the head 49 is provided with a transverse passage 79 for receiving a key 80. As shown in detail in FIG. 7 key 80 includes a median longitudinal slot 81 and recesses 82 on its side walls is adapted to slide in transverse passage 79. The head 49, , is also provided with two carriages 84 in housings 83 transverse to the conduit 79. Each carriage 84 is substantially U-shaped with two branches 85 and a centerpiece 86. Rollers 88, freely rotatable on spindles 89, are disposed in notches 90 on the inside of the centerpiece 86. The side surfaces of the branches 85 are guided on bearing surfaces 91 provided in the housings 83.

Figure 5:
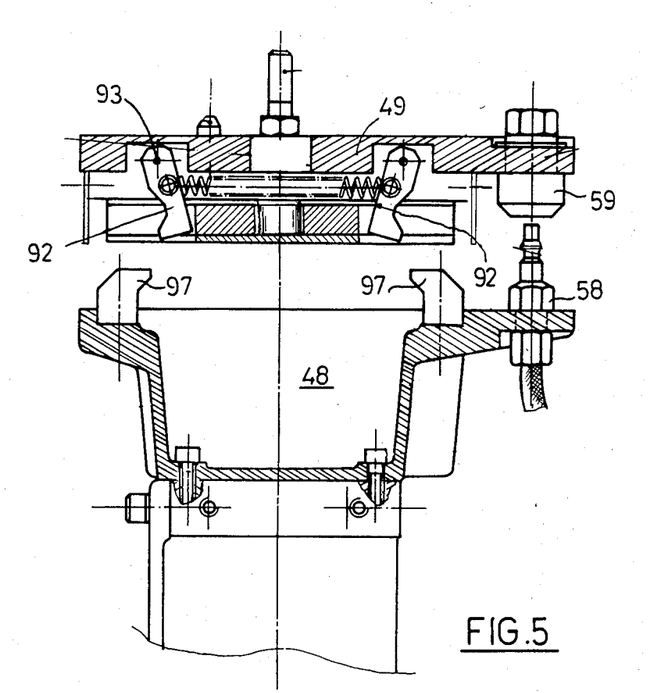
FIG. 5 is a view in cross-section on the line 5—5 in FIG. 4.

As shown in FIG. 5, the head 49 includes two latches 92 pivoted on spindles 93 and connected by tension springs 94 urging them into an unlatched position. The top 48 of the welding unit 5 is provided with two lugs 97 disposed so as to interlock with the latches 92.

Figure 7:
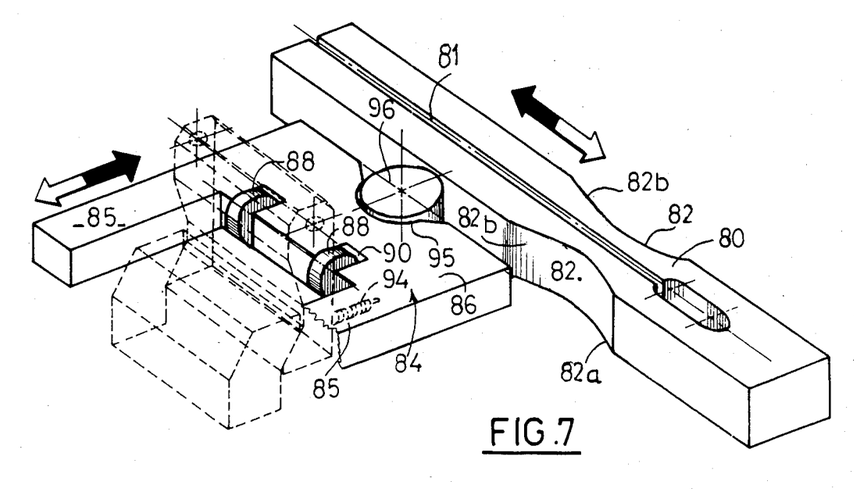
FIG. 7 is a perspective view showing the functioning of the coupling device of the robot.

Referring now to FIG. 7, the outside surface of the centerpiece 86 of each carriage 84 faces towards the key 80 and features a recess 95. A roller 96, which can also locate in the corresponding recess 82 in the key 80, is partially accommodated in recess 95. It will be noted that the recesses 82 feature a circular arc-shaped part 82a the radius of which substantially corresponds to that of the roller 96 and a ramp-shaped part 82b merging with the lateral walls of the key. It will be readily understood that when the key 80 is so disposed that the rollers 96 cooperate with the bottom of the recesses 82, the latches 92 will tend to move away from the lugs 97 so as to release them, because of the action of the springs 94. On the other hand, when the rollers 96 cooperate with the lateral walls of the key 80, the carriages 84 are moved apart and through the rollers 88 push on the latches 92 which cooperate with the lugs 97 to lock the head 49 of the robot to the top 48.

Figure 3:
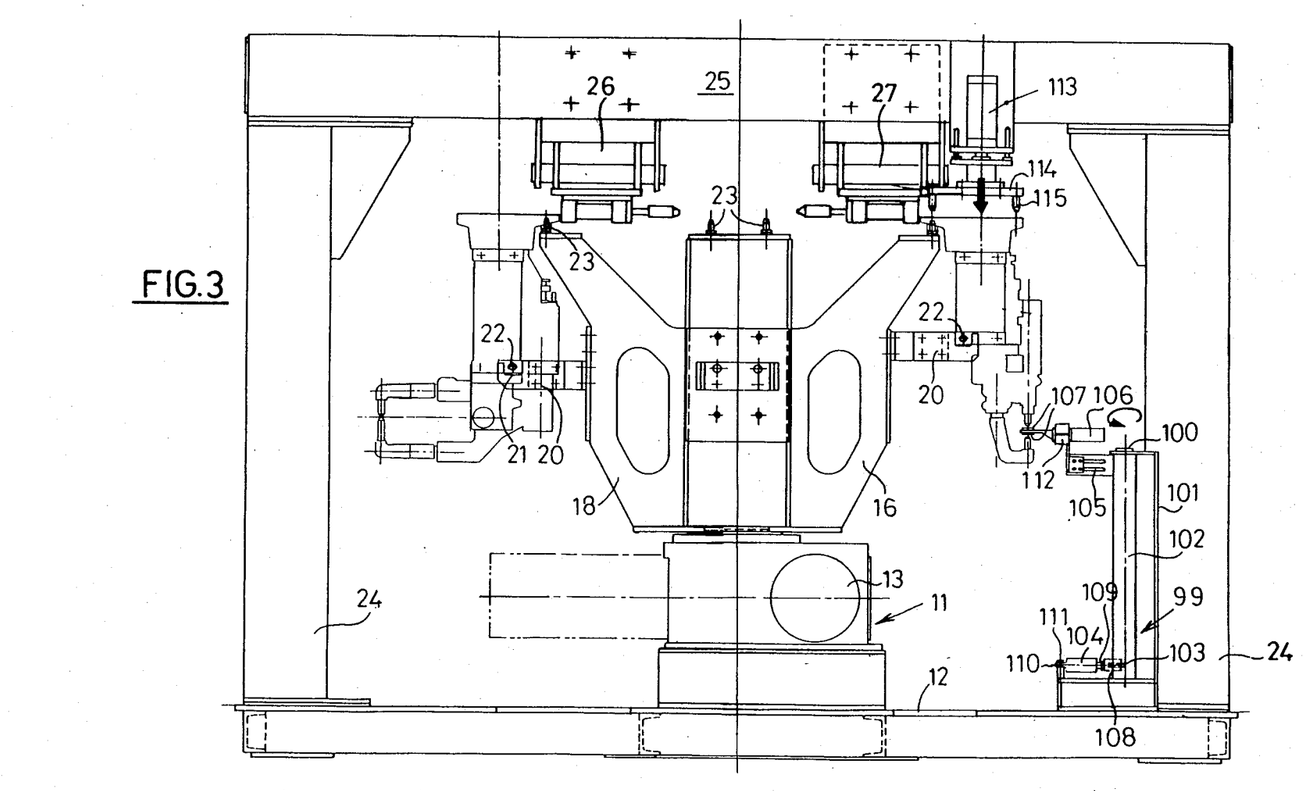
FIG. 3 is a side view in elevation of the device in accordance with the invention.

Turning to FIG. 3, the base 12 may also include a device 99 for grinding the electrodes of a welding unit 5. Typically the electrodes become soiled during the course of normal operation and must be regularly ground to clean them until a predetermined degree of wear is reached at which point the electrodes have to be replaced. To this end, device 99 includes a fixed shaft 100 supported by a frame 101 on which is rotatably mounted a sleeve 102 equipped with a radial lug 103. A yoke 108, pivotally connected to the radial lug 103, is fixed to the free end of the piston rod 109 of a piston-and-cylinder actuator 104. The body of piston-and-cylinder actuator 104 is equipped with lug 110 pivoted on a shaft 111 in the frame 101. The sleeve 102 includes a lateral support 105 equipped with a flange 112 for fixing a motor 106 which rotates the grinding wheels 107.

A piston-and-cylinder actuator 113 is attached to the beam 25. The actuator 13 includes a piston rod 113a which is fastened to a piston head 114 adapted to be connected to the top end 48 of the welding unit 5. The piston head 114 includes centering fingers 115 adapted to cooperate with the sleeve 73 and connectors, such as the connectors 58 feeding the piston-and-cylinder actuator of the welding unit 5, so that the electrodes are held against the grinding wheels 107. The angular position of the grinding wheels 107 may be modified by operating the piston-and-cylinder actuator 104 so that they can grind electrodes of different types of welding units, such as those shown in FIG. 3.

As previously mentioned, the motor 13 may be programmed to rotate the frame 14, preferably in steps of 90°, so that there are thus defined four stations A, B, C, D.

The operation of the apparatus in accordance with the invention will now be described. The robot 1 is programmed so as to be able to place a welding unit 5 or other tool on a support 15, 16, 17 or 18 of the vertical frame 14. For purposes of this discussion, the support occupying the position corresponding to the station A is shown as support 15 in FIG. 2. The robot 1 is also programmed to be able to take up a welding unit 5 or other tool disposed on the support occupying station A. As can be seen in FIGS. 1 and 2, manual intervention may simultaneously take place at station C while the station B is occupied by the device 99 for grinding the electrodes. The remaining station D is a standby station for a replacement unit and is not accessible since it is situated in the vicinity of column 8.

When the robot 1 puts down a welding unit 5 on a support 15, 16, 17 or 18, the decoupling unit 26 is then actuated. To this end, compressed air is fed to the piston-and-cylinder actuator 33 of the decoupling unit so that plunger 47 in the passage 79 butts up against key 80 and pushed the key in the direction of the arrow f (FIG. 6). The roller 96 then cooperates with part 82b and is received in part 82a. As a result of the action of the springs 94, the carriages 84 move towards the key 80 the latches 92 release the lugs 97. Compressed air is then fed to the piston-and-cylinder actuator 33 from the piston rod end so as to return the plunger 47 to its initial position. The robot 1 is then moved in such a manner that its head 49 moves away from the end 48, and the various electrical, pneumatic and hydraulic connecting devices are separated. When this occurs, the fluid circuits close off automatically by virtue of the connectors 57, 58, as described above.

The device in accordance with the invention is then rotated 90° in the direction of the arrow g (see FIG. 2) so that the support 15 is moved into the position B, where the electrodes of the welding unit 5 are ground, while a new unit mounted on the support 18 is moved into station A. The robot 1 positions itself so that its head 49 lines up with the top 48. To this end, the fingers 75 cooperate with the sleeve 73 to ensure perfect guiding of the head 49 relative to the top 48. In so doing, the connectors 57, 58 and 59 couple together while the male plugs 51 and 54 cooperate with the corresponding female members. When these various connections have been made, in other words when the abutments 78 bear against the free end of the sleeve 73, the unit 27 is operated so that its plunger 47 enters the passage 79 to push the key 80 in the direction of arrow h, whereupon the rollers 96 are placed against the lateral surfaces of the key 80 after cooperating with the parts 82b. The rollers 96 push on the carriages 84 which move apart and push back the latches 92 which come to bear against the lugs 97 so that the head 49 is fastened to the end 48.

If the welding unit 5 which has been put down by the robot 1 needs to be repaired, or if the electrodes need to be changed, an operative at station C can carry out the work in complete safety.

From the foregoing description, one skilled in the art can easily ascertain the essential characteristics of this invention and, without departing from the spirit and scope thereof, make various changes and modifications of the invention to adapt it to various usages and conditions.

What is claimed is:

1. An apparatus for receiving and holding tools comprising:
    (a) a base adapted to be fastened to a floor;
    (b) a vertical frame rotatably mounted on said base;
    (c) a plurality of radial supports extending from said vertical frame provided with means for holding a tool;
    (d) means for automatically rotating said vertical frame about a vertical axis to position and radial supports at predetermined locations adjacent work stations;
    (e) a support frame located adjacent said base including:
        (i) vertical columns, and
        (ii) a horizontal beam supported by said vertical columns on which are mounted means for receiving a tool.

2. The apparatus according to claim 1, comprising:
    (f) means for manipulating a tool positioned adjacent said tool frame and adapted to contact said means for receiving a tool.

3. The apparatus according to claim 2, wherein said means for manipulating a tool is a robot.

4. The apparatus according to claim 2, wherein said means for receiving a tool is adapted to detach a tool from said means for manipulating a tool and to present said tool to said means for holding a tool.

5. The apparatus according to claim 4, comprising:
    (f) means for coupling a tool to said means for manipulating a tool adapted to convey said tool from said means for receiving a tool to said means for holding a tool.

6. The apparatus according to claim 5, comprising:
    (g) another vertical frame including a horizontal member located in the vicinity of said vertical support to which said means for receiving a tool and said means for coupling a tool are attached so as to be adjacent said tool.

7. The apparatus according to claim 6, wherein said means for manipulating a tool includes a head, said head comprising:
    (i) means for connection to an end of a tool having lugs,
    (ii) movable latches adapted to cooperate with said lugs at said end of said tool having lugs, and
    (iii) a sliding key adapted to be housed in a passage in said head and adapted to operate said latches.

8. The apparatus according to claim 7, wherein said means for coupling a tool includes a first piston-and-cylinder actuator carried on said horizontal member having a piston rod equipped with a plunger adapted to engage in said passage in said head so as to push said key in a corresponding first direction; and said means for detaching a tool includes a second piston-and-cylinder actuator equipped with a plunger adapted to engage in said passage in said head so as to push said key in a corresponding second direction opposite to said first direction.

9. The apparatus according to claim 8, further comprising units movable on said horizontal member for carrying said first piston-and-cylinder actuator and said second piston-and-cylinder actuator.

10. An apparatus according to claim 9, comprising means for immobilizing said vertical frame in position at predetermined locations adjacent work stations.

11. The apparatus according to claim 1, wherein said tools are resistance welding units having electrodes and one of said work stations is a work station for grinding said electrodes.

12. The apparatus according to claim 11, wherein said work station for grinding said electrodes comprises:
    (i) a piston-and-cylinder actuator equipped with a head adapted to cooperate with an end of a tool;
    (ii) two grinding wheels adapted to be inserted between said electrodes operably associated with said actuator;
    (iii) a motor operably connected for driving said grinding wheels; and
    (iv) means for moving said electrodes towards each other.

13. The apparatus according to claim 12, comprising:
    (v) a means for supporting said motor attached to said motor; and
    (vi) means for adjusting said position of said motor coupled to said means for supporting.

14. A method for automatically replacing tools manipulated by a robot comprising:
    (a) providing a frame elongated along a vertical axis having at least one radially extending support equipped with means for holding a tool operably connected to means for rotating a support about said vertical axis to position said radially extending support at predetermined locations adjacent work stations;
    (b) locating a support frame including a generally elongate horizontal member equipped with means for receiving a tool in the vicinity of said vertical frame adapted to communicate with said means for holding a tool;
    (c) positioning a robot having means for manipulating a tool adjacent said support frame so that is can be contacted by said means for receiving a tool;
    (d) activating said means for receiving a tool to contact said means for manipulating a tool, detach said tool from said means for manipulating a tool and present said tool to said means for holding a tool.

15. The method for automatically replacing tools in accordance with claim 14, comprising:
    (e) rotating said radially extending support about said vertical axis so as to remove said tool held by said means for holding a tool away from said means for receiving a tool to a work station.

16. The method for automatically replacing tools in accordance with claim 15, comprising:
    (f) supplying a tool to said means for holding a tool on said radially extending support;
    (g) rotating said radially extending support to convey said tool to said means for receiving a tool; and
    (h) activating said means for receiving a tool to disconnect said tool from said means for receiving a tool and to transfer said tool to said menas for manipulating a tool.

17. The method for automatically replacing tools in accordance with claim 16, wherein said tool is a welding unit having electrodes and said work station includes a grinder having abrasive elements for cleaning said electrodes comprising:

(i) moving said welding unit relative to said grinder so as to contact said electrodes against said abrasive elements.

18. An apparatus for receiving and holding tools comprising:
   (a) a base adapted to be fastened to a floor;
   (b) a vertical frame rotatably mounted on said base;
   (c) a plurality of radial supports extending from said vertical frame provided with means for holding a tool;
   (d) means for automatically rotating said vertical frame about a vertical axis to position said radial supports at predetermined locations adjacent work stations;
   (e) a support frame located adjacent said base including:
      (i) vertical columns, and
      (ii) a horizontal beam supported by said vertical columns on which are mounted means for receiving a tool;
   (f) means for manipulating a tool positioned adjacent said support frame and adapted to contact said means for receiving a tool, wherein said means for receiving a tool is adapted to detach a tool from said means for manipulating the tool and to present said tools to said means for holding a tool, said means for manipulating a tool including a head comprising:
      (i) means for connection to an end of a tool having lugs,
      (ii) movable latches adapted to cooperate with said lugs at said end of said tool having lugs,
      (iii) a sliding key adapted to be housed in a passage in said head and adapted to operate said latches,
      (iv) two carriages disposed one on each side of said key, each of said carriages being adapted to cooperate with one of said latches pivotally connected to said head,
      (v) a recess in the side of each carriage facing toward said key,
      (vi) a roller adapted to engage in each recess, and
      (vii) a ramp surface on said key adapted to cooperate with each roller so that movement of said key in one direction moves said carriages further apart and movement of said key in the opposite direction moves said carriages closer together.
   (g) means for coupling a tool to said means for manipulating a tool adapted to convey said tool from said means for receiving the tool to said means for holding the tool, said means for coupling a tool including a first piston-and-cylinder actuator carried on said horizontal member having a piston rod equipped with a plunger adapted to engage in said passage in said head so as to push said key in a corresponding first direction, and said means for detaching a tool including a second piston-and-cylinder actuator equipped with a plunger adapted to engage in said passage in said so as to push said key in a corresponding second direction opposite to said first direction; and
   (h) another vertical frame including a horizontal member located in the vicinity of said vertical support to which said means for receiving a tool and said means for coupling a tool are attached so as to be adjacent to said tool.

* * * * *

UNITED STATES PATENT AND TRADEMARK OFFICE
CERTIFICATE OF CORRECTION

PATENT NO. : 4,737,611

DATED : April 12, 1988

INVENTOR(S) : Bernard HUMBLOT

It is certified that error appears in the above-identified patent and that said Letters Patent is hereby corrected as shown below:

At column 1, line 48, change "break down or shut down" to ---breakdown or shutdown---.
At column 4, line 58, change "unit" to ---units---.
At column 5, line 28, change "movable" to ---movably---.
At column 7, line 14, delete "," after "49,".
At column 8, line 34, insert ---and--- after "80".
At column 10, line 62, change "menas" to ---means---.
At column 12, line 26, insert ---head--- before "so as to push".

Signed and Sealed this

Twentieth Day of December, 1988

Attest:

DONALD J. QUIGG

*Attesting Officer*   Commissioner of Patents and Trademarks